Figure 1:
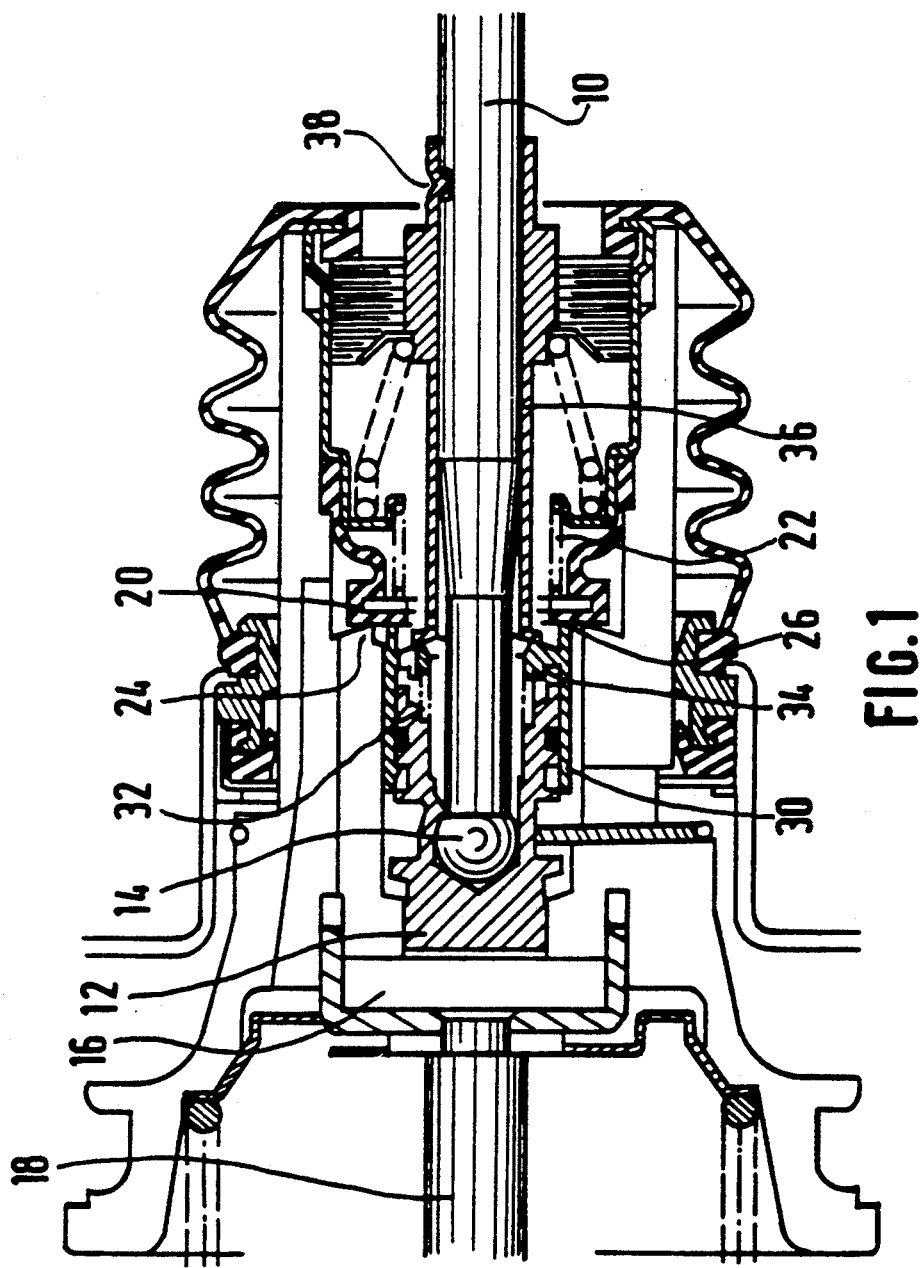

United States Patent [19]

Levrai et al.

[11] Patent Number: 5,176,063
[45] Date of Patent: Jan. 5, 1993

[54] BRAKE-BOOSTER WITH ADJUSTABLE JUMP AND PROCESS FOR ADJUSTING THE JUMP

[75] Inventors: Roland Levrai, Stains; Philippe Castel, Paris, both of France

[73] Assignee: Bendix Europe Services Techniques, Drancy, France

[21] Appl. No.: 831,602

[22] Filed: Feb. 5, 1992

[30] Foreign Application Priority Data

Feb. 28, 1991 [FR] France .................. 91 02390

[51] Int. Cl.⁵ .............................. F15B 9/10
[52] U.S. Cl. ........................ 91/369.2; 91/376 R
[58] Field of Search .......... 91/369.2, 369.3, 376 R; 60/554

[56] References Cited

U.S. PATENT DOCUMENTS

| | | | |
|---|---|---|---|
| 3,973,593 | 8/1976 | Muller | 91/376 R |
| 4,817,500 | 4/1989 | Gautier | 91/376 R |
| 4,934,249 | 6/1990 | Gautier et al. | 91/369.3 |
| 5,096,267 | 3/1992 | Volz | 91/376 R |

FOREIGN PATENT DOCUMENTS 0220987 5/1987 European Pat. Off.
2617451 1/1989 France.

Primary Examiner—John T. Kwon
Assistant Examiner—F. Daniel Lopez
Attorney, Agent, or Firm—Larry J. Palguta; Ken C. Decker

[57] ABSTRACT

The invention relates to a pneumatic brake-booster comprising, in series, a control rod (10) substantially fixed to a plunger (12) by a pivot mechanism (14), a reaction disk (16) and a push rod (18), the control rod (10) actuating a three-way valve with two seats (24, 26), s specific space being provided at rest between the reaction disk (16) and the plunger (12). According to the invention, one of the two seats of the valve consists of the end of a sleeve (30) coaxial with the plunger (12), a prestressed compressible mechanism (32) tending to shift the sleeve (30) and plunger (12) axially away from one another, the sleeve (30) coming axially up against one end of a piece (36) fixed to the control rod (10) after the relative positions have been set.

9 Claims, 2 Drawing Sheets

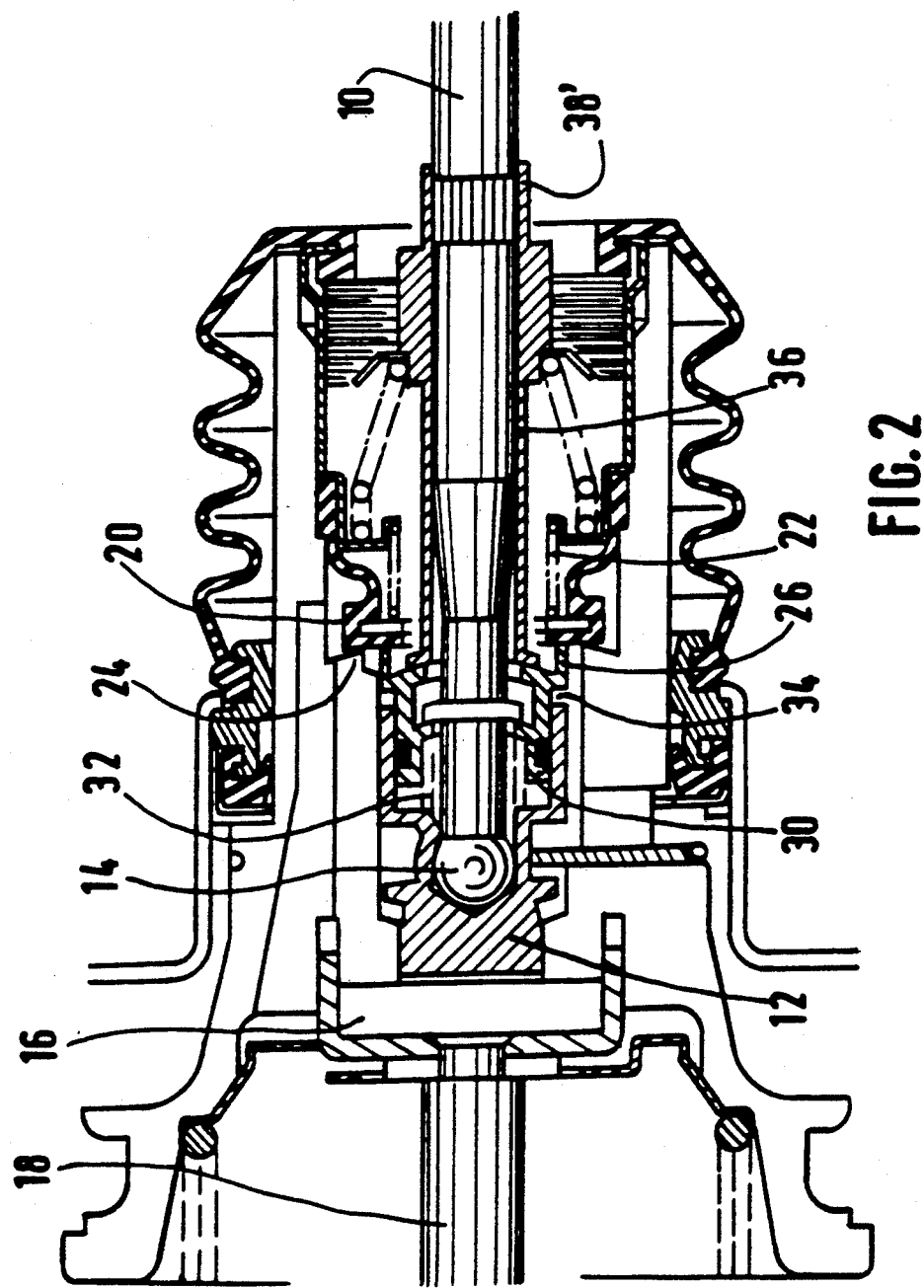

5,176,063

BRAKE-BOOSTER WITH ADJUSTABLE JUMP AND PROCESS FOR ADJUSTING THE JUMP

The invention relates to brake-boosters and applies more particularly to the adjustment of the jump of such boosters.

A brake-booster generally comprises a control rod which is displaced forwards when the vehicle driver actuates the brake pedal. This displacement of the control rod is transmitted to a plunger which actuates boost means. In general, these boost means comprise a two-seat three-way valve, the actuation of which makes it possible to interrupt communication between a front chamber and a rear chamber of the booster and to connect the latter chamber to the atmosphere. Because the front chamber is normally under a vacuum, a boost force is thus exerted on the piston separating the two chambers. The piston is then displaced forwards, at the same time acting on a push rod serving for actuating the master cylinder of the brake circuit.

The piston serving for transmitting the boost force to the push rod acts on the latter via a reaction disk produced from a deformable material, such as an elastomer. At rest, a small play is present between the front end of the plunger and the reaction disk. When the vehicle driver begins to actuate the brake pedal, this small play allows the plunger to be displaced forwards immediately in order to control the boost means and ensure an immediate response of the brakes.

The effect of transmitting the boost force exerted on the piston to the push rod via the reaction disk is to compress the peripheral part of the reaction disk axially in proportion to the boost force. This compression of the peripheral part of the reaction disk results in a deformation of the central part of this disk towards the front face of the plunger. When the boost force exceeds a particular threshold, the play initially present at rest between the reaction disk and the front face of the plunger is taken up, so that the plunger is in contact with the reaction disk and the latter returns toward the brake pedal a reaction force representing the braking force applied to the brakes of the vehicle. This well-known arrangement enables the driver to meter the braking force which he exerts on the pedal as a function of the resistance which he encounters and which increases with this force.

It emerges from the foregoing explanation that the pedal reaction begins to appear only when the boost force generated as a result of the actuation of the brake pedal exceeds a particular threshold. This threshold is called the "jump" of the booster. It is an important characteristic of the booster. In fact, although it is necessary for the jump to exist in order to ensure an immediate response of the brakes whenever the pedal is actuated, motor-vehicle manufacturers will generally like the value of this jump to remain within particular limits so that the boost does not reach too high a value without an increase in the pedal reaction.

However, particularly in view of the production tolerances of the various component parts of the booster, there can be considerable differences in the value of the jump from one booster to another. Likewise, the master cylinders intended to be actuated by the push rod of the booster themselves suffer from a spread of their characteristics, with the result that the performances of a brake-booster/master-cylinder assembly can vary within an extremely wide range. Moreover, at the present time there is no practical means for controlling or adjusting the value of the jump of the booster, and therefore the abovementioned requirements are not always satisfied, unless complex checks involving a high outlay are conducted.

The document FR-A-2,480,898 provides a process for adjusting the value of the jump of each booster. This costly process has to be carried out before the assembly of the booster and therefore cannot allow for the production tolerances of the various component parts of the booster.

One object of the present invention is to overcome the abovementioned disadvantages with a booster, of which the adjustment of the jump can be carried out after the complete assembly of the booster.

Another object of the invention is to provide such a process for adjusting the jump.

The invention therefore applies to a pneumatic brake-booster comprising, in series, a control rod substantially fixed relative to a plunger by a pivot means, a reaction disk and a push rod, the control rod actuating a two-seat three-way valve, and a space being provided at rest between the reaction disk and the plunger for determining the jump.

According to the invention, one of the two seats of the valve consists of a sleeve coaxial with the plunger, a prestressed compressible means tending to shift the sleeve and plunger axially away from one another, the sleeve coming axially up against a piece fixed to the control rod, after the relative positions have been set.

The invention will now be described by way of example with reference to the accompanying drawings in which:

FIG. 1 shows a pneumatic booster according to the invention diagrammatically in section, and FIG. 2 shows a variant of the embodiment of FIG. 1.

Referring now to FIG. 1, an average person skilled in the art will recognise the control rod 10 actuated by a pedal (not shown). This control rod 10 is fixed to a plunger 12 by a pivot means 14 allowing some offset of the control rod 10.

The plunger 12 is located opposite one face of the reaction disk 16, onto the other face of which is laid the push rod 18 actuating the piston of the master cylinder (not shown). The jump is determined by the space provided between the reaction disk 16 and the opposite end of the plunger 12.

Conventionally, the booster comprises a two-seat three-way valve consisting of a diaphragm 20, on which a spring 22 bears, and of two seats.

The first seat 24, when the diaphragm 20 rests on it, interrupts communication between a front chamber of the booster connected permanently to a vacuum source and a rear chamber.

The second seat 26, when the diaphragm 20 rests on it, interrupts communication between the ambient air and the rear chamber. The functioning of the valve is well known and will not be repeated in detail here.

According to the embodiment of FIG. 1, this second seat 26 consists of the end of a cylindrical sleeve 30 arranged around the plunger 12. A spring 32 tends to shift the sleeve 30 and plunger 12 away from one another. This spring can be replaced by a plastic ring performing the same function.

The sleeve 30 comes axially with a dog 34 up against one end of a substantially cylindrical piece 36 fixed to the control rod 10, after the relative positions of the components have been set.

This dog 34 and the end of the piece 36 assume a partially spherical shape substantially of the same center as that of the pivot means 14, in order to benefit the possibility of the abovementioned offset of the control rod 10.

The adjustment of the desired jump is obtained in the following way.

In a first step, the components of the booster are assembled, but the control rod 10 is not fixed to the piece 36. Thus, the plunger 12 and the sleeve 30 can slide axially relative to one another under the effect of the spring 32.

The two valve seats 24, 26 are then placed in the same radial plane as a result of the axial displacement of the piece 36, of which the position in relation to the body of the booster is then fixed.

Subsequently, by the axial displacement of the control rod 10, the space provided between the reaction disk 16 and the plunger 12, that is to say the jump of the booster, can be adjusted. When the desired jump is obtained, the piece 36 and the control rod 10 are fixed relative to one another by any means, such as crimping 38. The spring 32 then no longer has any effect. This ensures an exact adjustment of the jump after the assembly of the booster, without the need to provide complex and costly means. Furthermore, the setting of the jump is carried out in a unitary manner, that is to say the jump obtained is completely independent of all the production tolerances of the booster. Finally, this adjustment is made from outside the booster and does not require its dismounting.

Referring to FIG. 2, a variant of the embodiment described above has been represented. On that FIG. 2, the elements identical or similar to those of FIG. 1 have been given the same reference numerals. It can be seen on FIG. 2 that the second seat 26 consists of the end of a cylindrical sleeve 30 arranged within the plunger 12, the spring 32 tending to shift them away from one another in order that the surface 34 of the sleeve 30 interacts with the end of the piece 36 partially spherically shaped, as previously described. The adjustment of the booster of FIG. 2 is obtained in exactly the same way as that of FIG. 1.

Of course, an average person skilled in the art can make many changes to the invention, without departing from the scope defined by the accompanying claims. For example, as shown on FIG. 2, it can be provided that the piece 36 be forced onto the control rod 10 by way of a knurling 38' on the control rod 10, making the crimping 38 optional.

Finally, it should be noted that, for example by the used of a tilting stop key, the invention makes it possible to adjust the idle travel of the booster after the assembly of the latter.

We claim:

1. Pneumatic brake-booster comprising, in series, a control rod (10) substantially fixed to a plunger (12) by pivot means (14), a reaction disk (16) and a push rod (18), the control rod (10) actuating a three-way valve with two seats (24, 26), a specific space being provided at rest between the reaction disk (16) and said plunger (12), characterized in that one (26) of the two seats of said valve consists of an end of a sleeve (30) arranged coaxial with said plunger (12), prestressed compressible means (32) tending to shift the sleeve (30) and plunger (12) axially away from one another, said sleeve (30) coming axially up against one end of a piece (36) fixed to said control rod (10) after relative positions have been set.

2. Pneumatic brake-booster according to claim 1, characterized in that said compressible means (32) is a spring.

3. Pneumatic brake-booster according to claim 1, characterized in that a butting surfaces of said sleeve (30) and said piece (36) assume a partially spherical shape substantially of the same center as that of the pivot means (14).

4. Pneumatic brake booster according to claim 3, characterized in that the sleeve (30) is arranged around the plunger (12).

5. Pneumatic brake booster according to claim 3, characterized in that the sleeve (30) is arranged within the plunger (12).

6. Pneumatic brake-booster according to claim 1, characterized in that said piece (36) is crimped (38) onto said control rod (10).

7. Pneumatic brake booster according to claim 1, characterized in that said piece (36) is forced onto said control rod (10).

8. Process for adjusting the jump of a booster according to claim 1, characterized in that:
said two seats (24, 26) are arranged in one radial plane as a result of displacement of said piece (36), a position of which is fixed axially;
said control rod (10) is displaced axially to obtain said specific space; and
said control rod (10) and said piece (36) are fixed relative to one another.

9. Process for adjusting the jump of a booster according to claim 8, characterized in that said control rod (10) and said piece (36) are fixed relative to one another by crimping (38).

* * * * *